(12) United States Patent
Bodell et al.

(10) Patent No.: US 11,847,303 B1
(45) Date of Patent: Dec. 19, 2023

(54) USER INTERFACE FOR DEPICTING INFORMATIONAL ELEMENTS FOR SELECTABLE ITEMS

(71) Applicant: American Express Travel Related Services Company, Inc., New York, NY (US)

(72) Inventors: Matthew Stephen Bodell, New York, NY (US); Sorin Grigore, New York, NY (US); Josephine Shapiro, New York, NY (US); Indiana Maria Baltodano, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 17/892,390

(22) Filed: Aug. 22, 2022

(51) Int. Cl.
| | |
|---|---|
| *G06F 3/0482* | (2013.01) |
| *G06F 3/14* | (2006.01) |
| *G06Q 40/04* | (2012.01) |
| *G06N 5/022* | (2023.01) |
| *H04L 67/52* | (2022.01) |
| *G06V 30/10* | (2022.01) |
| *G06F 40/58* | (2020.01) |
| *G06F 40/20* | (2020.01) |

(52) U.S. Cl.
CPC ............. *G06F 3/0482* (2013.01); *G06F 3/14* (2013.01); *G06N 5/022* (2013.01); *G06Q 40/04* (2013.01); *G06F 40/20* (2020.01); *G06F 40/58* (2020.01); *G06V 30/10* (2022.01); *H04L 67/52* (2022.05)

(58) Field of Classification Search
CPC ......... G06F 3/0482; G06F 3/14; G06N 5/022; G06Q 40/04
See application file for complete search history.

(56) References Cited

U.S. PATENT DOCUMENTS

| | | | | |
|---|---|---|---|---|
| 9,179,278 B2* | 11/2015 | Das | ...................... | G06F 16/434 |
| 11,468,462 B2* | 10/2022 | Beaver | ............... | G06Q 30/0282 |
| 2015/0373116 A1* | 12/2015 | Mo | ........................ | G06F 3/0608 |
| | | | | 709/219 |
| 2018/0365302 A1* | 12/2018 | Tabun | .................... | G06F 16/248 |
| 2021/0375056 A1* | 12/2021 | Charlton | ............... | G06T 19/003 |
| 2021/0398065 A1* | 12/2021 | Johnsen | ............... | G06Q 10/087 |
| 2022/0066841 A1* | 3/2022 | Wei | ........................ | G06F 16/906 |

* cited by examiner

*Primary Examiner* — Seth A Silverman
(74) *Attorney, Agent, or Firm* — Sterne, Kessler, Goldstein & Fox P.L.L.C.

(57) ABSTRACT

A computing device (e.g., a server, a cloud-based device, a network device, an item analysis device, etc.) may receive location information indicating a geographic location of a user device and image data captured by the user device of a listing (e.g., a menu, an event ticket, a content source, etc.) for a selectable item. The computing device may determine an entity offering the selectable item based on the location information. An intent indicator for the selectable item may be determined based on the entity and the information for the selectable item. An instruction to the user device may cause modification of the image data to indicate the intent indicator based on the intent indicator satisfying an intent threshold that defines a level at which an intent is classified as a positive intent.

20 Claims, 10 Drawing Sheets

USER INTERFACE FOR DEPICTING INFORMATIONAL ELEMENTS FOR SELECTABLE ITEMS

BACKGROUND

When viewing information, such as content source listing of items and/or a menu at an entity (e.g., merchant, restaurant, business establishment, food service location, etc.) location, a user is unaware of recommended items, allergen details, dietary restrictions, and/or the like that may affect which items the user selects. Online menus, webpages, and/or the like may include information describing menu items, but information describing a particular menu item at a location where a user is currently viewing a menu is routinely unavailable, cumbersome to access, and/or incorrect. Online menus, webpages, and/or the like describe menu items generally but fail to include details that may be unique to a particular entity location. A user may be unaware that an entity location is well-known for preparing a menu item unfavorably when an online menu, webpage, and/or the like only includes general information for the menu item. The inability of online menus, webpages, and/or the like to provide location-specific and/or user-specific menu item details may cause a user to suffer from allergic reactions, unfavorable dietary health effects, and an impaired user experience.

SUMMARY

Provided herein is a system, apparatus, article of manufacture, method and/or computer program product embodiments, and/or combinations and sub-combinations thereof, for a user interface for depicting informational elements for selectable items. According to some aspects, a computing device (e.g., a server, a cloud-based device, a network device, an item analysis device, etc.) may receive location information indicating a geographic location of a user device and image data captured by the user device of a listing (e.g., a menu, an event ticket, a content source, etc.) for a selectable item. The computing device may determine an entity offering the selectable item based on the location information. According to some aspects, a selectable item may include a food menu item, a product, a device, and/or any other type of item that may be selected from a plurality of items. An intent indicator for the selectable item may be determined based on the entity and the information for the selectable item. An instruction to the user device causes modification of the image data to indicate the intent indicator based on the intent indicator satisfying an intent threshold that defines a level at which an intent is classified as a positive intent.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art to make and use the embodiments.

Figure 1:
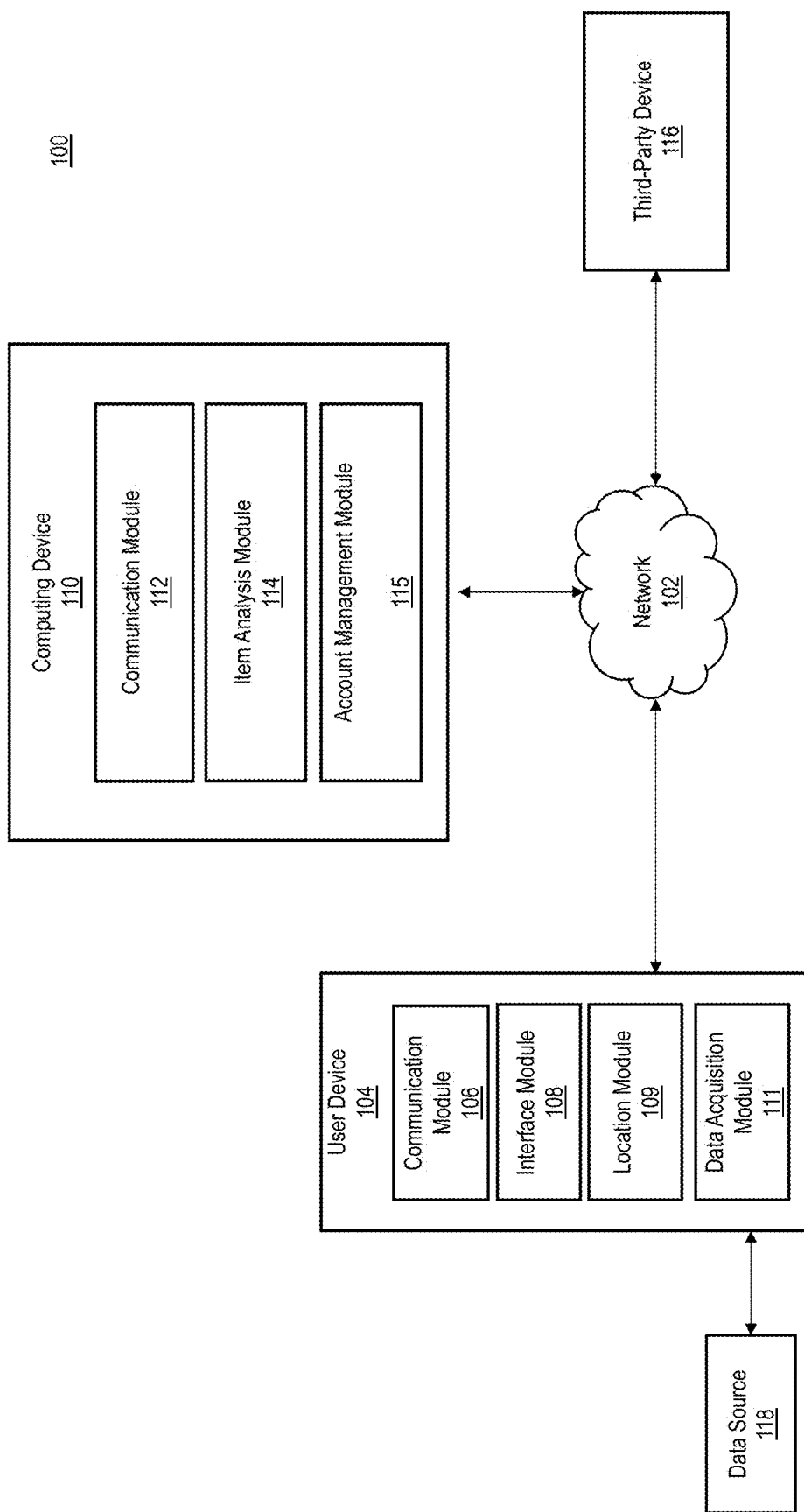
FIG. 1 shows a block diagram of an example system for a user interface to depict informational elements for selectable items, according to some aspects.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

Provided herein is a system, apparatus, article of manufacture, method and/or computer program product embodiments, and/or combinations and sub-combinations thereof, for a user interface for depicting informational elements for selectable items. According to some aspects, a user sitting at the table at an entity (e.g., merchant, restaurant, business establishment, food service location, etc.) location may use a user device (e.g., a smart device, a mobile device, a computing device, etc.) to view a listing (e.g., menu, content source, etc.) of selectable items. Image data of the listing may be analyzed to identify text describing selectable items (e.g., menu items, products, devices, services, etc.). The geolocation of the user device and text from the menu may be used to identify the location of the entity. The location of the entity may be used to cross-reference reviews, commentary, opinions, articles, and/or the like to recommend certain selectable items based on "positive intent" for the selectable items (e.g., "the paella is fantastic," "XYZ provides the best service," the new model X mobile device is the best," etc.). Recommendations for selectable items may be displayed as an overlay to image data depicting the menu. The depiction of the menu may include language-translated text, currency exchange information, user notifications, and/or the like.

FIG. 1 shows an example system 100 for a user interface for depicting informational elements for selectable items. The system 100 is merely an example of one suitable system environment and is not intended to suggest any limitation as to the scope of use or functionality of aspects described herein. The system 100 should not be interpreted as having any dependency or requirement related to any single module/component or combination of modules/components described therein.

The system 100 may include a network 102. The network 102 may include a packet-switched network (e.g., interne protocol-based network), a non-packet switched network (e.g., quadrature amplitude modulation-based network), and/or the like. The network 102 may include network adapters, switches, routers, modems, and the like connected through wireless links (e.g., radiofrequency, satellite) and/or physical links (e.g., fiber optic cable, coaxial cable, Ethernet cable, or a combination thereof). The network 102 may include public networks, private networks, wide area networks (e.g., Internet), local area networks, and/or the like. The network 102 may include a payment network and/or may support/facilitate financial transactions. The network 102 may provide and/or support communication from a telephone, cellular phone, modem, and/or other electronic devices to and throughout the system 100. For example, the system 100 may include and support communications between a user device 104, a computing device 110, and a third party device 116 via the network 102.

According to some aspects, the user device 104 may include a smart device, a mobile device, a computing device, and/or any other device capable of communicating with the network 102 and/or device/components in communication with the network 102.

The user device 104 may include and/or be associated with a digital wallet. The digital wallet may include payment information and passwords associated with the user device 104 (e.g., associated with a user of the user device 104). For example, the digital wallet may include payment card information. The payment card may be associated with a primary account number (PAN). In some instances, the PAN may be tokenized for security. The PAN associated with the user device 104 may be stored by a payment network (e.g., a payment network configured with, supported by, and/or enabled by the network 102, etc.) in a database record linked to a payment account (and/or user profile) associated with a user (e.g., a user associated with and/or using the user device 104, etc.). The payment account may be maintained/controlled by the computing device 110. For example, the computing device 110 may include and/or be part of a device/network associated with a financial institution that issues the payment account.

The user device 104 may include a communication module 106 that facilitates and/or enables communication with the network 102 (e.g., devices, components, and/or systems of the network 102, etc.), the computing device 110, the third-party device 116, and/or any other device/component of the system 100. For example, the communication module 106 may include hardware and/or software to facilitate communication. The communication module 106 may comprise one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. The communication module 106 may include any hardware and/or software necessary to facilitate communication.

According to some aspects, the user device 104 may include an interface module 108. The interface module 108 enables a user to interact with the user device 104, the network 102, the computing device 110, the third-party device 116, and/or any other device/component of the system 100. The interface module 108 may include any interface for presenting and/or receiving information to/from a user.

According to some aspects, the interface module 108 may include a web browser (e.g., INTERNET EXPLORER®, MOZILLA FIREFOX®, GOOGLE CHROME®, SAFARI®, or the like), a mobile device application (e.g., AMEX PAY®, APPLE PAY®, SAMSUNG PAY®, GOOGLE PAY®, etc.) and the like. Other software, hardware, and/or interfaces can be used to provide communication between the user device 104, the network 102, the computing device 110, the third-party device 116, and/or any other device/component of the system 100. The interface module 108 may request/query and/or send/provide various files from a local source and/or a remote source, such as the computing device 110, the third-party device 116, and/or any other device/component of the system 100.

According to some aspects, the interface module 108 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to view, access, request, and/or navigate a user interface generated, accessible, and/or displayed by the interface module 108. According to some aspects, interaction with the input devices and/or components may enable a user to manipulate and/or interact with components of a user interface, for example, such as depictions of selectable items, intent indicators, payment facilitation elements, currency exchange elements, interactive elements, windows, and/or the like.

According to some aspects, the user device 104 may include a location module 109. The location module 109 can be configured with and/or communicate with a global positioning system (GPS) antenna. The GPS antenna may be used to determine a location (e.g., the geolocation, etc.) of the user device 104. According to some aspects, the location module 109 may determine a location of the user device 104 based on Wi-Fi communications, Bluetooth communications, cellular base station triangulation, a combination thereof, and/or the like. The location module 109 may determine a location of the user device 104 and/or the location of a service associated with the user device 104, for example, such as a restaurant location, a merchant location, and/or any other location, based on any technique, technology, and/or method.

According to some aspects, the user device 104 may include a data acquisition module 111 for capturing and/or receiving data/information. For example, the interface module 108 may include an imaging device/component (e.g., a camera, an imaging sensor, etc.), a data source (e.g., a quick response (QR) code, a near field communication (NFC) tag, a barcode, a watermark, etc.) scanner, and/or the like for capturing and/or receiving data/information, such as image data depicting selectable items (e.g., food menu items, products, devices, services, etc.). The interface module 108 may be and/or may include any interface for presenting and/or receiving information to/from the user.

According to some aspects, the data acquisition module 111 may be used to acquire data/information, such as imaging data and/or the like, of a data source 118. The data source 118 may be and/or may include, but is not limited to, a menu that lists selectable items (e.g., dishes, meals, etc.) available at a restaurant/merchant location, a content source listing services/devices provides at a service/merchant location, and/or the like. For example, a user of the user device 104 may position a camera of the data acquisition module 111 to capture image data depicting selectable items displayed, listed, and/or indicated by a menu (e.g., the data source 118, etc.). According to some aspects, the imaging data may be displayed to a user of the user device example, via the interface module 108 and/or the like.

Figure 2A:
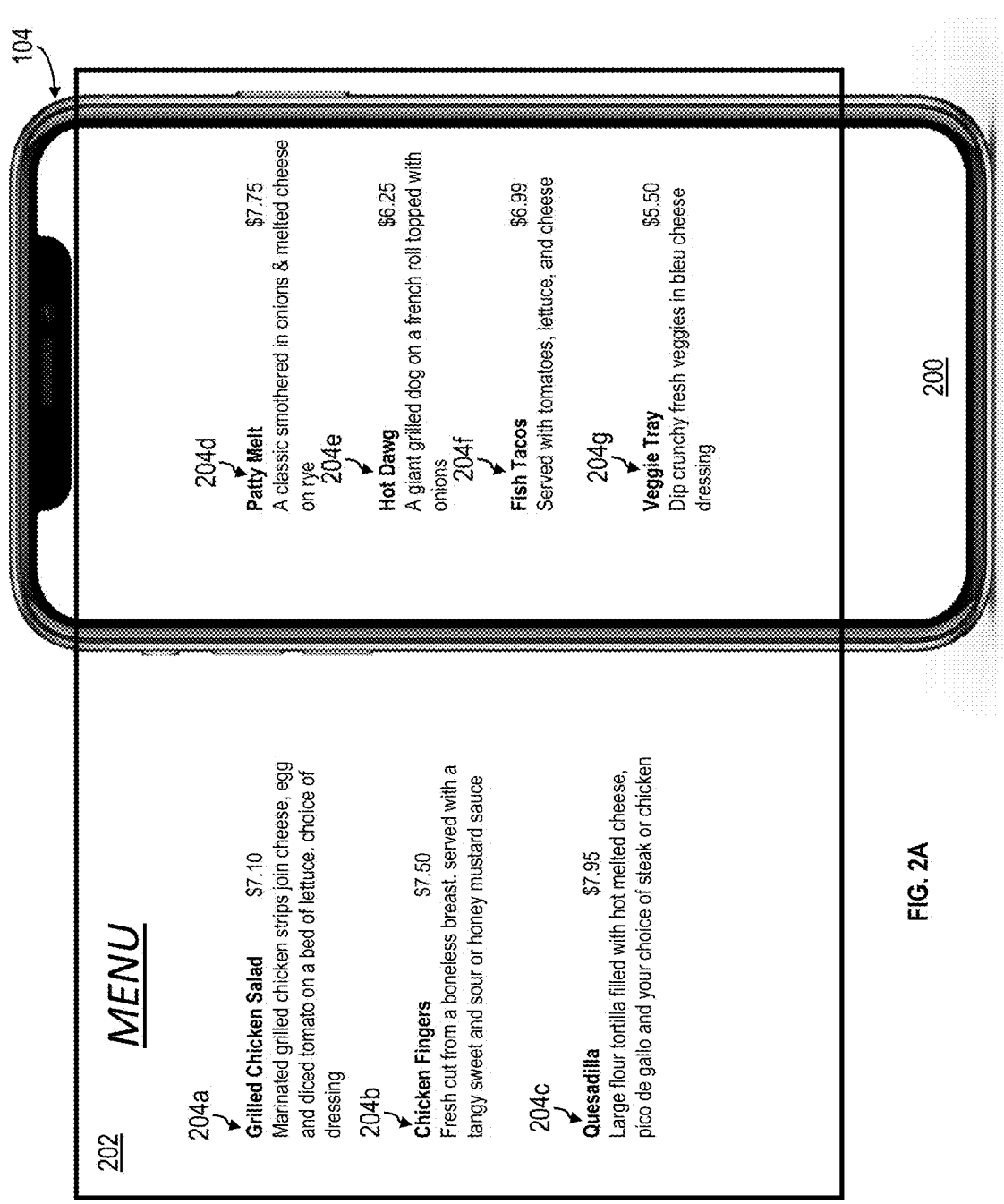
FIGS. 2A-2E show an example user interface depicting informational elements for selectable items, according to some aspects.

FIG. 2A shows an example of a user interface for depicting informational elements for selectable items. The user device 104 may display a user interface 200. For example, according to some aspects, the user interface 200 may be generated, accessed, and/or displayed by the interface module 108. The user device 104 may be positioned such that a camera of the data acquisition module 111 captures image data of a menu 202 (e.g., the data source 118, etc.) depicting selectable items 204a-204g. It will be appreciated that, although menu 202 is shown in FIG. 2A, the data acquisition module 111 may capture image data of any content source (e.g., a sign, a display, a book, a virtual source, an advertisement, video, text, multimedia, etc.) and/or information element listing depicting selectable items.

Returning to FIG. 1, according to some aspects, the user device 104 may communicate, send, and/or transmit image data depicting selectable items to the computing device 110. For example, the user device 104 (and/or the computing device 110) may be configured with and/or may include an application and/or an application programming interface (API) that includes services, libraries, code, a combination thereof, and/or the like. The application and/or the API may enable the user device 104 to communicate, send, and/or transmit image data depicting selectable items to the computing device 110.

According to some aspects, the computing device 110 may include, but is not limited to, a server, a cloud-based device, a network device, an item analysis device, and/or the like. The computing device 110 may include a communication module 112 that facilitates and/or enables communication with the network 102 (e.g., devices, components, and/or systems of the network 102, etc.), the user device 104, the third-party device 116, and/or any other device/component of the system 100. For example, the communication module 112 may include hardware and/or software to facilitate communication. The communication module 112 may comprise one or more of a modem, transceiver (e.g., wireless transceiver, etc.), digital-to-analog converter, analog-to-digital converter, encoder, decoder, modulator, demodulator, tuner (e.g., QAM tuner, QPSK tuner, etc.), and/or the like. The communication module 112 may include any hardware and/or software necessary to facilitate communication.

According to some aspects, the computing device 110 may include an item analysis module 114. The item analysis module 114 may include an information translator that may identify text and/or the like, for example, using OCR and/or the like. The information translator may detect text in multiple different languages. For example, the item analysis module 114 may include an OCR engine that is capable of recognizing text in multiple languages, or an OCR engine for each of multiple different languages.

According to some aspects, the item analysis module 114 may also detect characteristics of the text, such as text color, background color, text size, font type, and/or location of the text within image data (e.g., images, video, etc.). These characteristics can be used, for example, to identify distinct text blocks. For example, item analysis module 114 may determine that two portions of text depicted in an image are included in two distinct text blocks based on the two portions of text having different font colors, different background colors, or being spaced apart from one another (e.g., being at least a threshold distance apart).

According to some aspects, the item analysis module 114 may include a natural language processor and/or may perform natural language processing (NLP). NLP enables the item analysis module 114 to understand text, for example, text describing selectable items and/or the like. For example, the item analysis module 114 may receive and/or be provided image data depicting selectable items (e.g., food items and/or the like presented on a menu, etc.). According to some aspects, the item analysis module 114 may determine, identify, and/or extract text data from the image data (e.g., using optical character recognition (OCR), etc.) and prepare (e.g., clean, serialize, etc.) the text data for analysis. Text data may be converted and/or transformed, for example, using semantic data preprocessing, and/or the like, to a workable form that highlights features in the text that one or more analysis algorithms can be applied. Conversion and/or transformation of text data (indicative of selectable items and/or the like) may be based on including, but not limited to, tokenization (e.g., the text is broken down into smaller units, etc.), stop word removal (e.g., words may be removed from text so unique words that offer the most information about the text remain, etc.), lemmatization and stemming (e.g., words may be reduced to their root forms to process, etc.), part-of-speech tagging (e.g., words may be marked based on parts-of-speech including nouns, verbs, adjectives, etc.), and/or the like.

According to some aspects, the item analysis module 114 may use rules-based analysis (e.g., applying linguistic rules to text to identify context) and/or machine learning (as described later herein) to analyze preprocessed text data (e.g., indicative of selectable items and/or the like) to determine and/or identify the context, intent, and/or the like of any text (e.g., text describing selectable items, etc.). For example, according to some aspects, the item analysis module 114 may determine and/or identify that text indicated on a menu (e.g., the menu 202 of FIG. 2A, etc.) and/or the like describes various food items (e.g., the selectable items 204a-204g of FIG. 2A, etc.), ingredients, beverages, desserts, and/or the like.

According to some aspects, the computing device 110 may identify text and/or information including, but not limited to, text indicated on a menu describing selectable items and/or the like, presented in a first format (e.g., language, font, script, symbolized form, etc.) and transform, translate, and/or convert the text and/or information presented in a first format to a second format (e.g., language, font, script, symbolized form, etc.). For example, according to some aspects, the computing device 110 may determine, perform, and/or facilitate language translations for any text indicated in image data received from the user device 104.

For example, according to some aspects, once the item analysis module 114 determines and/or identifies the context, intent, and/or the like of any text (e.g., text describing selectable items, etc.). The item analysis module 114 may determine, perform, and/or facilitate language translations of the text. According to some aspects, the item analysis module 114 may store and/or access data/information that includes rules for identifying and/or translating text in various languages. According to some aspects, the item analysis module 114 may communicate with a third party system, service, and/or the like (e.g., the third party device 116, an online translation application, device, service, etc.) and receive language translations for text data.

According to some aspects, the item analysis module 114 may translate any text identified in image data received from the user device 104 and the computing device 110 may send an instruction (and/or signal, command, REST API Command, etc.) to the user device 104 that causes and/or enables the user device 104 to display translated text.

Figure 2B:
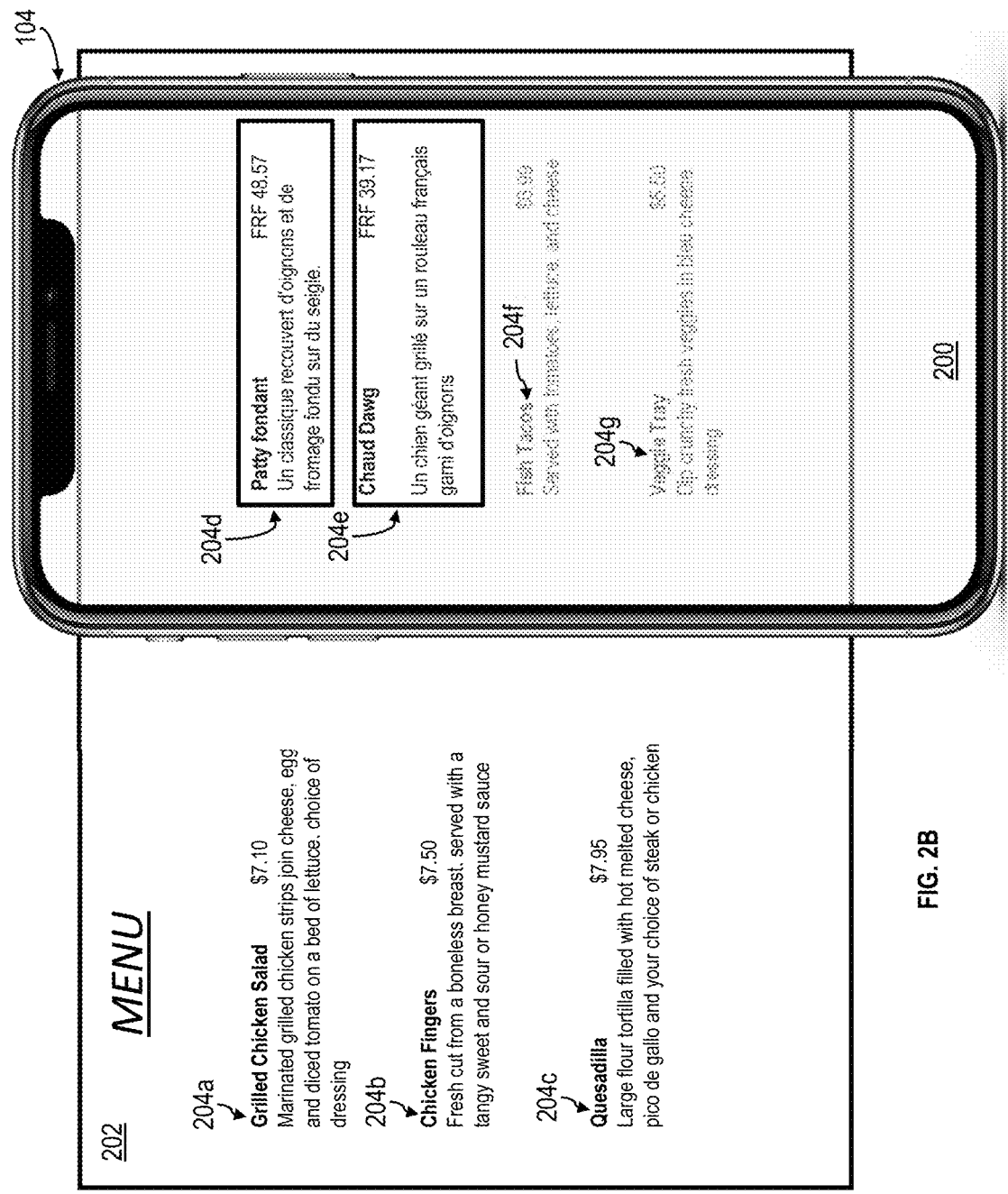

FIG. 2B shows an example of a user interface for depicting informational elements for selectable items. As described in FIG. 2A, the user device 104 may display the user interface 200. The user device 104 may be positioned such that a camera of the data acquisition module 111 captures image data of the menu 202 (e.g., the data source 118, etc.) depicting selectable items 204d-204g. As shown, the text describing the selectable items 204d and 204e has been translated from English (as shown in FIG. 2A) to French. The translated text is displayed as an overlay to the original text describing the selectable items 204d and 204e.

It will be appreciated that, although menu 202 is shown in FIG. 2B, the data acquisition module 111 may capture image data of any content source (e.g., a sign, a display, a book, a virtual source, an advertisement, video, text, multimedia, etc.) and/or information element listing depicting selectable items. Translated text (and/or characters, symbols, linguistic elements, etc.) may be displayed as an overlay to the original text (and/or characters, symbols, linguistic elements, etc.) describing any type of selectable items.

Referring to FIG. 1 and FIG. 2B, according to some aspects, the item analysis module 114 may determine a real-time exchange rate for a currency, such as an amount of currency for a selectable item indicated by image data. According to some aspects, the item analysis module 114 may store and/or access data/information (e.g., AMEX® database, etc.) that includes real-time, up-to-date, and/or current currency exchange rates and/or rules. The item analysis module 114 may identify a currency, for example, an amount of currency (e.g., price, etc.) indicated in image data for selectable items of a menu item, and convert the identified currency to a home currency of a user and/or user device (e.g., the user device 104, etc.) from which the image data is received. A home currency of a user and/or user device may be, for example, any currency that an issuer of a payment card (e.g., associated with a digital wallet, etc.) and/or the like that is associated/linked with the user and/or user device would utilize to complete a purchase, transaction, etc. of a selectable item.

For example, as shown in FIG. 2B, if a user and/or user device (e.g., the user device 104, etc.) is associated/linked with a payment card issued in France, the home currency would be the French franc (FF). The item analysis module 114 converts the currency indicated for the selectable items 204d and 204e from the United States dollar (as shown in FIG. 2A) to the French franc. The converted currency is displayed as an overlay to the original currency indicated for the selectable items 204d and 204e. According to some aspects, the item analysis module 114 may identify a currency, for example, an amount of currency (e.g., price, etc.) indicated in image data for selectable items of a menu, and convert the identified currency to any type of currency, for example, any type of currency indicated by a user and/or user device (e.g., the user device 104, etc.) from which image data is received. For example, the interface module 108 of the user device 104 may include a user interface that enables currency conversion settings to receive, store, and provide to the item analysis module 114 for currency conversions.

Returning to FIG. 1, according to some aspects, the computing device 110 may include an account management module 115. The account management module 115 may store information regarding user devices and/or users of user devices. Device identifiers may be mapped and/or associated with user identifiers and vice versa. For example, a device identifier may be used to identify a user identifier and/or a user profile/account. The user identifier may also be used to identify a device identifier and/or related profile/account. Data/information mapping and/or associating identifiers (e.g., device identifiers, user identifiers, entity identifiers, etc.) may be stored, for example, via a lookup table, and/or the like.

According to some aspects, the account management module 115 may store user profiles/accounts that include information that describes attributes associated with one or more users and/or user devices. User profiles/accounts may include information that indicates and/or describes demographic and/or demographic-related information, and/or language (e.g., native language information, preferred language information, location-based dialect and/or spoken language information, etc.) information. User profiles/accounts may include information that indicates and/or describes payment account/balance information, budget and/or budgetary constraint information, financial and/or transaction history information, and/or the like.

According to some aspects, the account management module 115 may store user profiles/accounts that include information that indicates and/or describes selectable items, entities, and/or foods preferred by a user, disliked by a user, experienced by a user, intended to be experienced by a user, and/or the like. User profiles/accounts may include information that indicates and/or describes dietary restrictions, medications and/or medical information for a user of a user device, allergen information for a user of a user device, selectable items for a user of a user device to avoid, recommended selectable items, and/or any other information regarding and/or about a user and/or selectable items. User profiles/accounts may include information that indicates and/or describes services and/or service types preferred/disliked by a user, describes services and/or service types experienced by a user, and/or the like. User profiles/accounts may include information that indicates and/or describes devices and/or device types preferred/disliked by a user, devices and/or device types previously owned and/or used by a user, etc. User profiles/accounts may include information that indicates and/or describes any information that may be used to identify, associate, describe, recommend, etc. selectable items to a user and/or depict informational elements for selectable items. The account management module 115 may store any information that may be used for a user interface to depict informational elements for selectable items.

According to some aspects, the item analysis module 114 may determine a notification for the selectable item indicated in image data received from a user device based on a user profile. For example, according to some aspects, the notification may include one or more dietary restrictions for the user indicated by the user profile. According to some aspects, the notification may include one or more hazard warnings and/or the like associated with a device and/or service indicated by the user profile. According to some aspects, the notification may include any information regarding and/or associated with selectable items.

According to some aspects, the item analysis module 114 may use an identifier received with image data to identify a user profile, then compare any selectable item indicated by image data to information associated with the user profile. According to some aspects, the computing device 110 may send an instruction to the user device that causes the user device to display a notification for a selectable item indicated in image data as an overlay of the information for the selectable item.

Figure 2C:
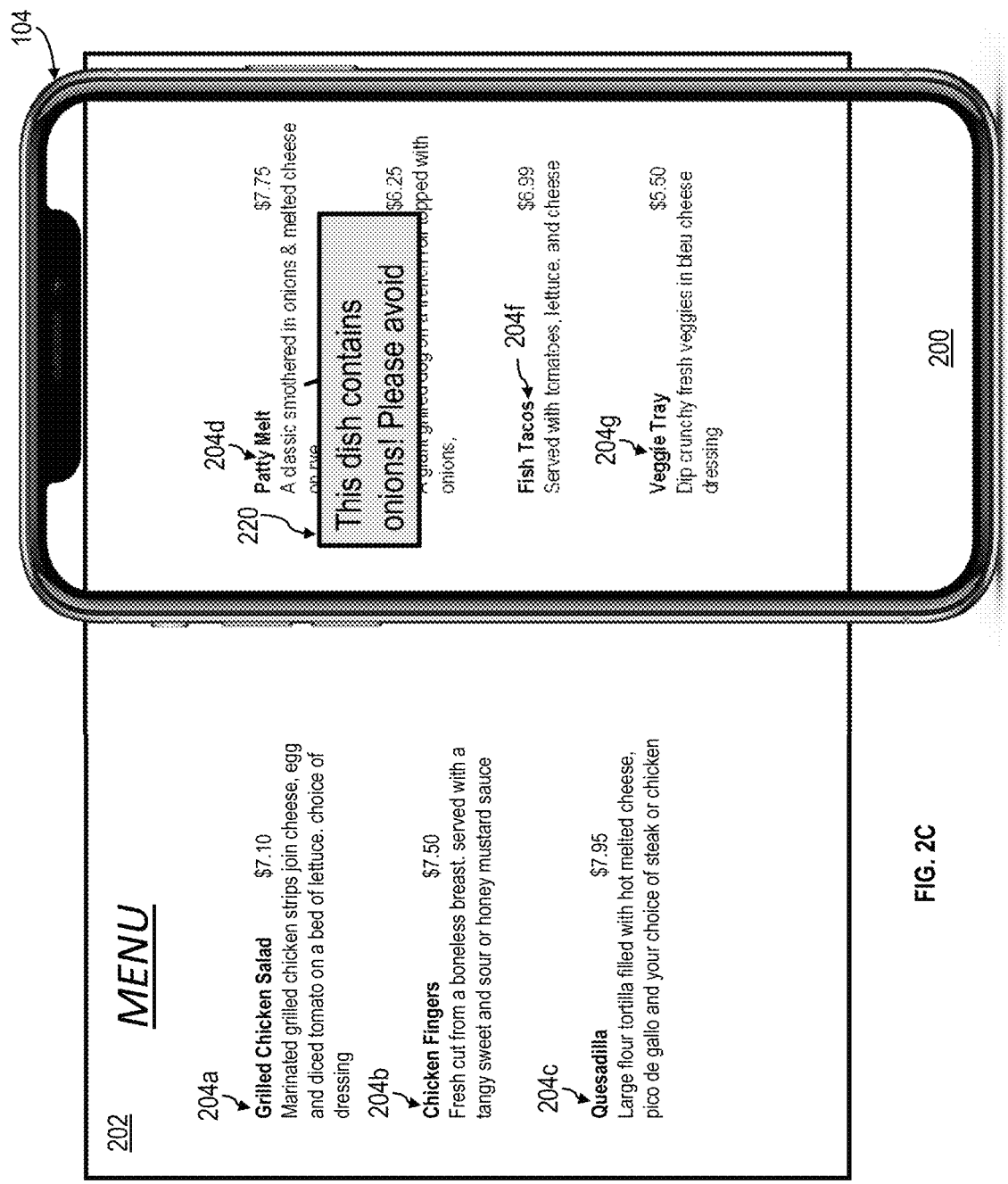

FIG. 2C shows an example of a user interface for depicting informational elements for selectable items. As described in FIG. 2A, the user device 104 may display the user interface 200. The user device 104 may be positioned such that a camera of the data acquisition module 111 captures image data of the menu 202 (e.g., the data source 118, etc.) depicting selectable items 204d-204g. It will be appreciated that, although menu 202 is shown in FIG. 2C, the data acquisition module 111 may capture image data of any content source (e.g., a sign, a display, a book, a virtual source, an advertisement, video, text, multimedia, etc.) and/or information element listing depicting selectable items.

As shown, a notification 220 for the selectable item 204*d* is shown as an overlay of the information describing the selectable item 204*d*. The item analysis module 114 determines (e.g., from analysis of text/ingredients, from predictive inference based on the name of the selectable item, etc.) that ingredients for the selectable item 204*d* contain an item/ingredient (e.g., onions) indicated as a dietary restriction and/or predicted to be a dietary restriction based on information in a user profile. According to some aspects, notifications caused to be displayed as overlays to selectable items may include any other information including, but not limited to, account information (e.g., available funds, recent transactions, restricted purchase items, etc.) for the user indicated by a user profile, recommended selectable items, and/or the like.

According to some aspects, the computing device 110 may receive location information indicating a geographic location of the user device 104 and image data captured by the user device 104 of a menu listing information for a selectable item. According to some aspects, the item analysis module 114 may determine an entity (e.g., merchant, restaurant, business establishment, food service location, etc.) offering the selectable item based on the location information. For example, the item analysis module 114 may map a location indicated for a user device to an address and/or location of an entity location. The mapping performed by the item analysis module 114 may associate the nearest entity to a location indicated for a user device as an entity offering a selectable item.

According to some aspects, the item analysis module 114 may determine intent indicators for selectable items. An intent indicator for the selectable item may be determined based on an entity offering a selectable item and information describing the selectable item. An intent indicator may be an indication of intents (e.g., opinions, sentiments, consumer views, selectable item reputation, etc.) for selectable items. According to some aspects, the item analysis module 114 may access a plurality of sources including, but not limited to, social media sites, blogs, online reviews, third-party (e.g., the third-party device 116, etc.) data sources, and/or the like to identify, collect, and/or analyze any information describing selectable items at an entity location. The computing device 110 may send an instruction to a user device (e.g., the user device 104, etc.) that causes modification of image data indicating selectable items to indicate one or more intent indicators that satisfy an intent threshold that defines a level at which intents are classified as positive intents. For example, a positive intent gathered from a social media site for a selectable item offered by an entity at a location may be a comment stating "I love the steak at the steak house on Amex street!"

Figure 2D:
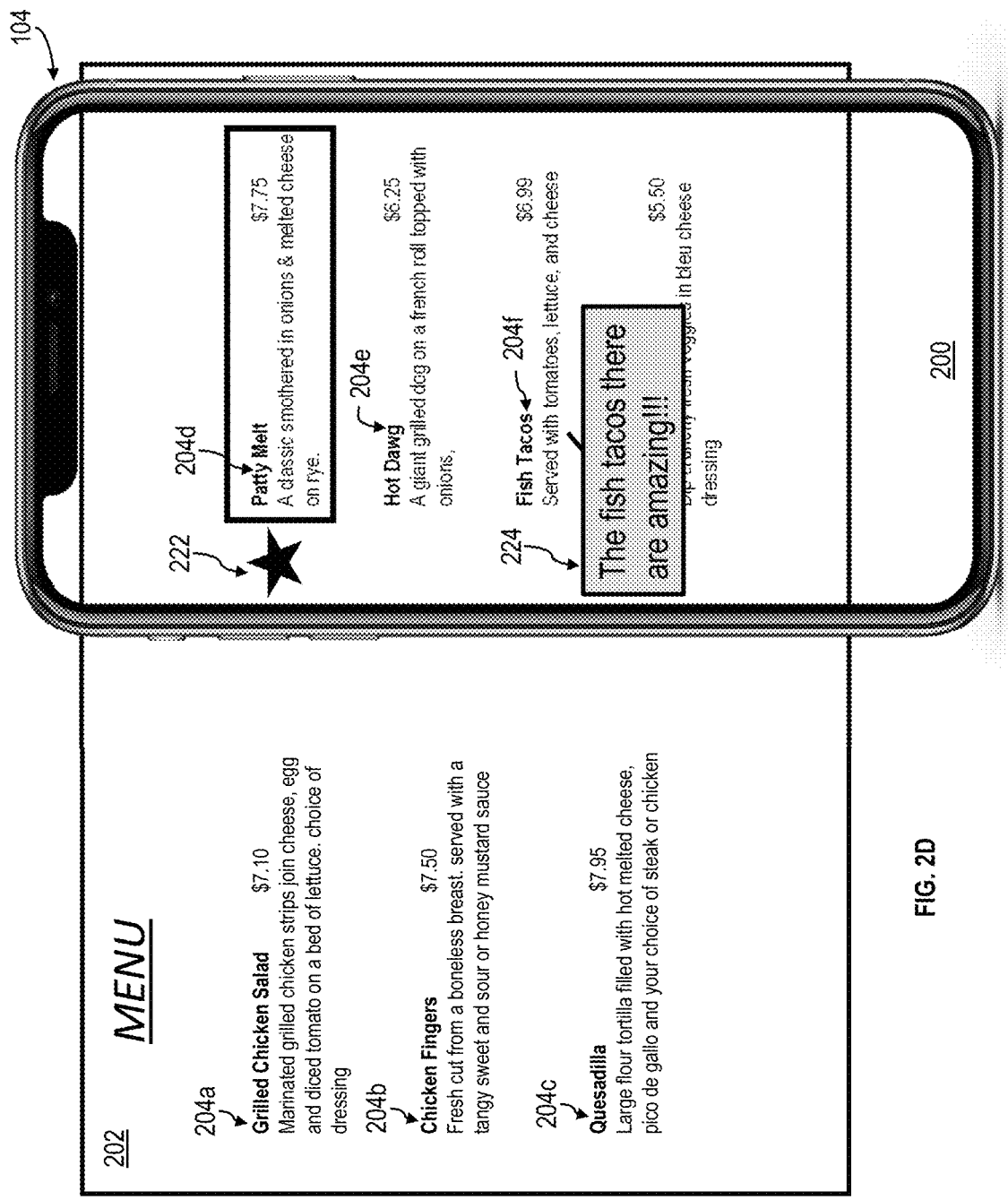

FIG. 2D shows an example of a user interface for depicting informational elements for selectable items. As described in FIG. 2A, the user device 104 may display the user interface 200. The user device 104 may be positioned such that a camera of the data acquisition module 111 captures image data of the menu 202 (e.g., the data source 118, etc.) depicting selectable items 204*d*-204*g*. It will be appreciated that, although menu 202 is shown in FIG. 2D, the data acquisition module 111 may capture image data of any content source (e.g., a sign, a display, a book, a virtual source, an advertisement, video, text, multimedia, etc.) and/or information element listing depicting selectable items.

According to some aspects, intent indicators include, but are not limited to symbols, text callouts, emojis, and/or any other indication of intent. As shown, intent indicators 222 and 224 indicate intents (e.g., positive intents) for selectable items 204*d* and 204*f*, respectively. Intent indicator 222 is a symbol indicating that the item analysis module 114 has determined that selectable item 204*d* offered at an entity location is associated with a threshold amount of positive intents. Intent indicator 224 is a text callout box recommending selectable item 204*f* because the item analysis module 114 has determined that selectable item 204*f* offered at an entity location is associated with an amount of positive intents.

Returning to FIG. 1, according to some aspects, item analysis module 114 may use a location of an entity determined from location information received from a user device to identify additional selectable items offered at the entity location. The item analysis module 114 may access, query, and/or receive data/information indicative of exclusive, additional, special, and/or the like selectable items offered at various locations. For example, the computing device 110 may receive location information indicating the geographic location of the user device 104 and image data captured by the user device 104 of a menu listing information for a selectable item. According to some aspects, the item analysis module 114 may determine an entity (e.g., merchant, restaurant, business establishment, food service location, etc.) offering the selectable item based on the location information. The item analysis module 114 may access, query, and/or receive data/information indicative of exclusive, additional, special, and/or the like selectable items offered by the entity and cause the user device 104 to display an indication of the exclusive, additional, special, and/or the like selectable items.

Figure 2E:
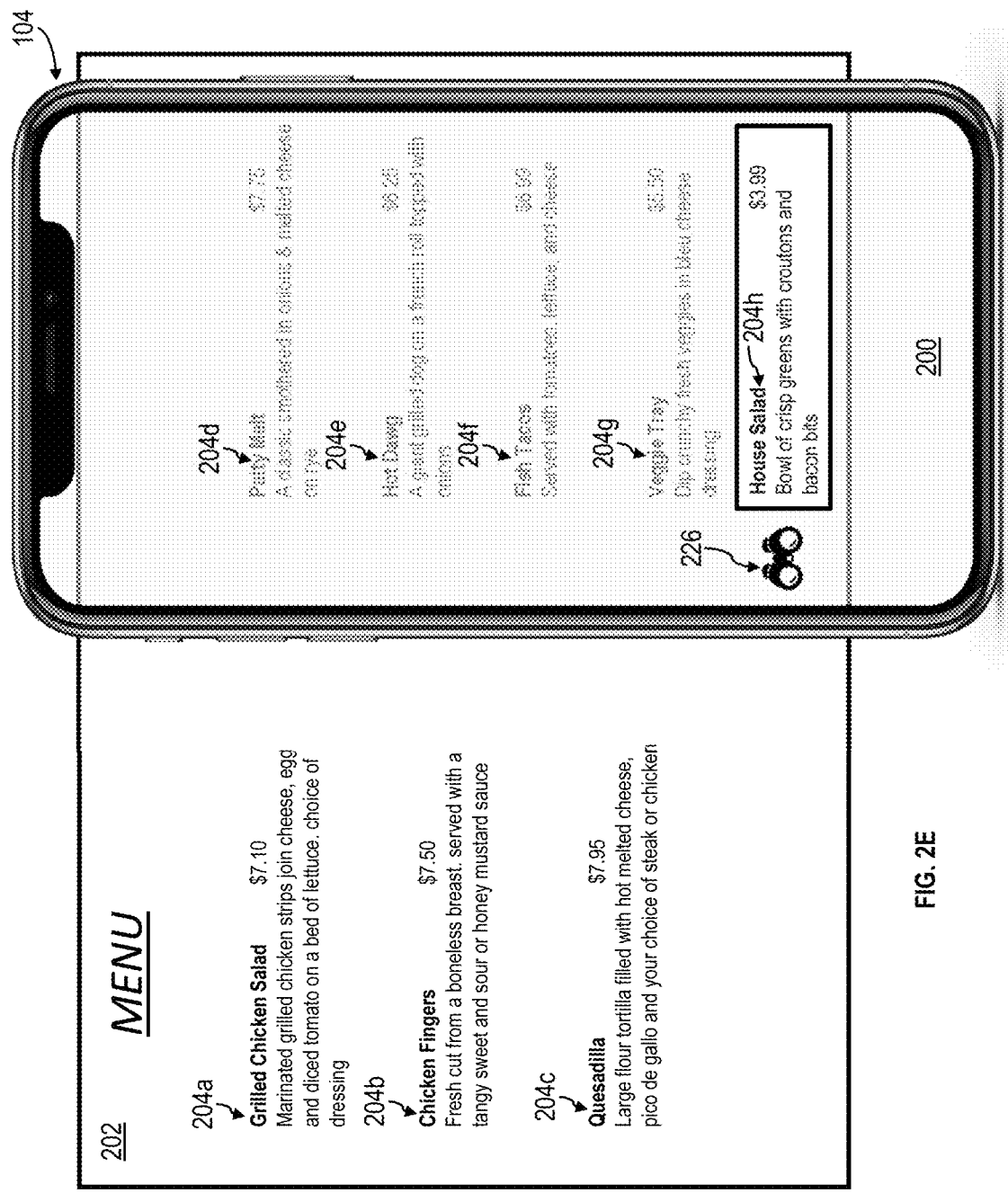

FIG. 2E shows an example of a user interface for depicting informational elements for selectable items. As described in FIG. 2A, the user device 104 may display the user interface 200. The user device 104 may be positioned such that a camera of the data acquisition module 111 captures image data of the menu 202 (e.g., the data source 118, etc.) depicting selectable items 204*d*-204*g*. It will be appreciated that, although menu 202 is shown in FIG. 2E, the data acquisition module 111 may capture image data of any content source (e.g., a sign, a display, a book, a virtual source, an advertisement, video, text, multimedia, etc.) and/or information element listing depicting selectable items.

According to some aspects, the item analysis module 114 may determine an entity associated with the menu 202 based on location information received from the user device 104. The item analysis module 114 may access, query, and/or receive data/information indicative of an exclusive, additional, special, and/or the like selectable item 204*h* offered by the entity. The user interface 200 may display an indicator 226 of the selectable item 204*h*.

Figure 3:
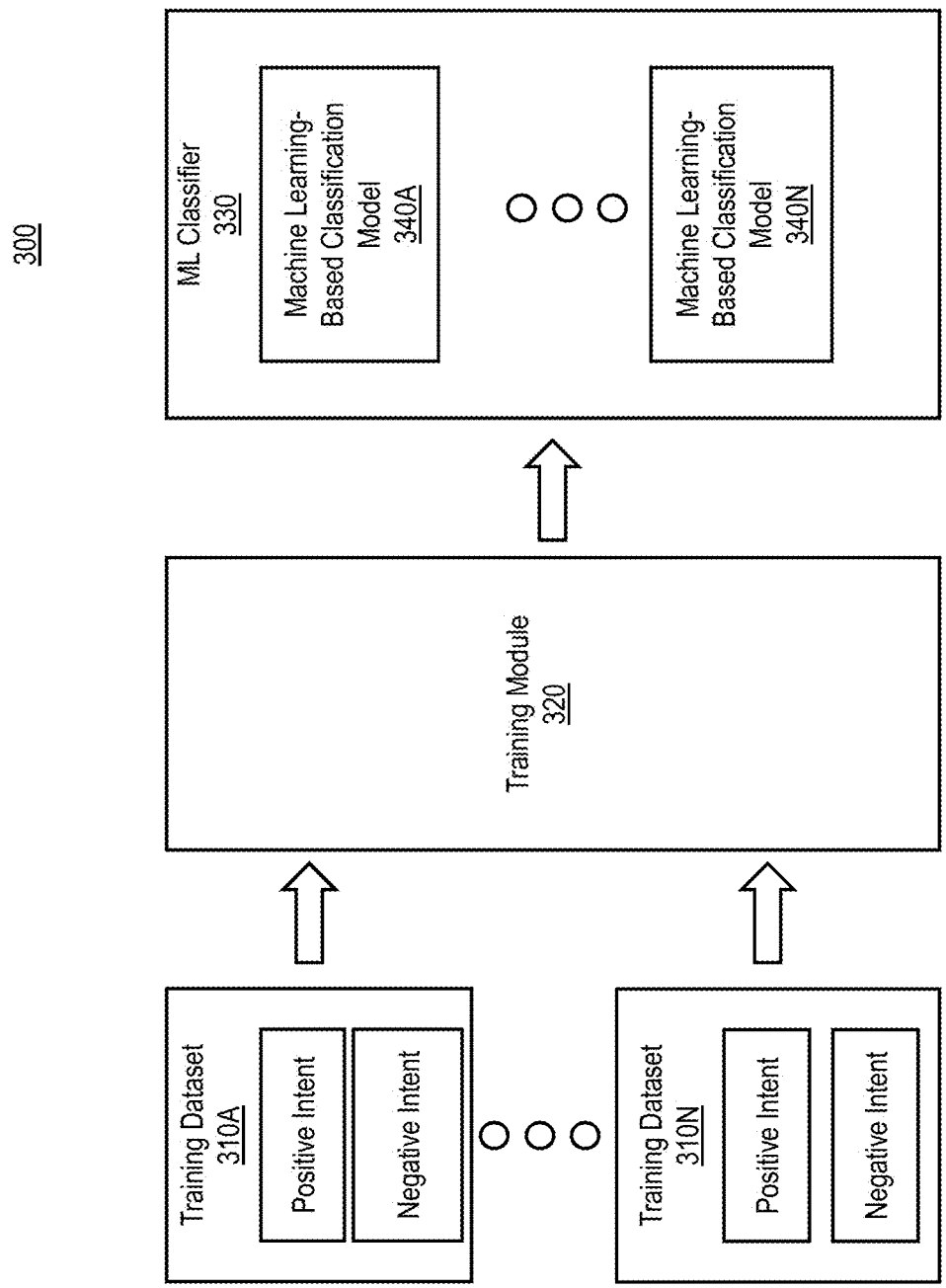
FIG. 3 shows an example system for training an item analysis module, according to some aspects.

FIG. 3 is described with reference to FIG. 1. FIG. 3 is an example system 300 for training the item analysis module 114 to identify intents (e.g., opinions, sentiments, consumer views, selectable item reputation, etc.) from information from various sources (e.g., the third-party device 116 of FIG. 1, online and cloud-based resources, social media, item review sites, etc.) describing selectable items at various locations (e.g., restaurants, merchant locations, etc.), according to some aspects of this disclosure. For example, the item analysis module 114 may identify intents from various sources and determine intents that satisfy an intent threshold. According to some aspects, an intent threshold may define a level at which an intent is classified as a type of intent (e.g., a positive intent, a negative intent, etc.). According to some aspects, the item analysis module 114 may be trained to recommend selectable items, for example, to users (e.g., the user device 104, etc.) and/or devices/entities viewing and/or displaying multiple selectable items, for example, listed on a menu and/or the like. According to some aspects, the item analysis module 114 may be trained to identify text and/or information presented in a first format (e.g., language, font, script, symbolized form, etc.) and transform, translate, and/or convert text and/or information presented in a first format to a second format (e.g., language, font, script, symbolized form, etc.). According to some aspects, the item analysis module 114 may be trained to perform any type of item analysis, such as analysis of selectable items depicted in image data.

According to some aspects, the system 300 may use machine learning techniques to train at least one machine learning-based classifier 330 (e.g., a software model, neural network classification layer, etc.). The machine learning-based classifier 330 may be trained by the item analysis module 114 based on an analysis of one or more training datasets 310A-310N. The machine learning-based classifier 330 may be configured to classify features extracted from image data, for example, image data received from the user device 104 of FIG. 1. The machine learning-based classifier 330 may be configured to classify features extracted from various data sources, for example, data/information received from the third-party device 116 of FIG. 1 and/or the like describing intents for selectable items at various locations (e.g., restaurant locations, merchant locations, etc.) from the user device 104 of FIG. 1. The machine learning-based classifier 330 may classify features extracted from image data to identify data/information formats, currency exchange information, and/or the like. The machine learning-based classifier 330 may classify features extracted from various data sources, for example, data/information received from the third-party device 116 of FIG. 1 and/or the like to identify intents for selectable items that satisfy an intent threshold.

The one or more training datasets 310A-310N may comprise labeled baseline data such as labeled currency types/symbols, labeled intent indicators (e.g., comments, text, symbols, emojis, etc.) for selectable items, labeled demographic information (e.g., data mapping selectable items and/or item types to demographic characteristics associated with various users — child users like hot dogs, male users enjoy steak, etc.), and/or the like. The labeled baseline data may include any number of feature sets. Feature sets may include, but are not limited to, labeled data that identifies extracted features from image data, various data sources (e.g., the third-party device 116 of FIG. 1, online and cloud-based resources, social media, item review sites, etc.) describing selectable items at various locations (e.g., restaurants, merchant locations, etc.), and/or the like.

The labeled baseline data may be stored in one or more databases. Data for user interfaces to depict informational elements for selectable items may be randomly assigned to a training dataset or a testing dataset. According to some aspects, the assignment of data to a training dataset or a testing dataset may not be completely random. In this case, one or more criteria may be used during the assignment, such as ensuring that similar intents, similar information formats (e.g., language, font, script, symbolized form, etc.), similar demographic and selectable item pairings, dissimilar intents, dissimilar information formats, dissimilar and selectable item pairings, and/or the like may be used in each of the training and testing datasets. In general, any suitable method may be used to assign the data to the training or testing datasets.

The item analysis module 114 may train the machine learning-based classifier 330 by extracting a feature set from the labeled baseline data according to one or more feature selection techniques. According to some aspects, the item analysis module 114 may further define the feature set obtained from the labeled baseline data by applying one or more feature selection techniques to the labeled baseline data in the one or more training datasets 310A-310N. The item analysis module 114 may extract a feature set from the training datasets 310A-310N in a variety of ways. The item analysis module 114 may perform feature extraction multiple times, each time using a different feature-extraction technique. In some instances, the feature sets generated using the different techniques may each be used to generate different machine learning-based classification models 340. According to some aspects, the feature set with the highest quality metrics may be selected for use in training. The item analysis module 114 may use the feature set(s) to build one or more machine learning-based classification models 340A-340N that are configured to determine and/or predict intents, information formats, demographic and selectable item pairings, and/or the like.

According to some aspects, the training datasets 310A-310N and/or the labeled baseline data may be analyzed to determine any dependencies, associations, and/or correlations between intents, information formats, demographic and selectable item pairings, and/or the like in the training datasets 310A-310N and/or the labeled baseline data. The term "feature," as used herein, may refer to any characteristic of an item of data that may be used to determine whether the item of data falls within one or more specific categories. For example, the features described herein may comprise intents, information formats, demographic and selectable item pairings, and/or the like.

According to some aspects, a feature selection technique may comprise one or more feature selection rules. The one or more feature selection rules may comprise determining which features in the labeled baseline data appear over a threshold number of times in the labeled baseline data and identifying those features that satisfy the threshold as candidate features. For example, any features that appear greater than or equal to 2 times the labeled baseline data may be considered candidate features. Any features appearing less than 2 times may be excluded from consideration as a feature. According to some aspects, a single feature selection rule may be applied to select features or multiple feature selection rules may be applied to select features. According to some aspects, the feature selection rules may be applied in a cascading fashion, with the feature selection rules being applied in a specific order and applied to the results of the previous rule. For example, the feature selection rule may be applied to the labeled baseline data to generate information (e.g., an indication of intents, information formats, demographic and selectable item pairings, etc.) that may be used for a user interface to depict informational elements for selectable items. A final list of candidate features may be analyzed according to additional features.

According to some aspects, the item analysis module 114 may generate information (e.g., an indication of intents, information formats, demographic and selectable item pairings, etc.) that may be used by a user interface to depict informational elements for selectable items based on a wrapper method. A wrapper method may be configured to use a subset of features and train the machine learning model using the subset of features. Based on the inferences that are drawn from a previous model, features may be added and/or deleted from the subset. Wrapper methods include, for example, forward feature selection, backward feature elimination, recursive feature elimination, combinations thereof, and the like. According to some aspects, forward feature selection may be used to identify one or more candidate intents, information formats, demographic and selectable item pairings, and/or the like. Forward feature selection is an iterative method that begins with no feature in the machine learning model. In each iteration, the feature which best improves the model is added until the addition of a new variable does not improve the performance of the machine learning model. According to some aspects, backward elimination may be used to identify one or more candidate intents, information formats, demographic and selectable item pairings, and/or the like. Backward elimination is an iterative method that begins with all features in the machine learning model. In each iteration, the least significant feature is removed until no improvement is observed in the removal of features. According to some aspects, recursive feature elimination may be used to identify one or more candidate intents, information formats, demographic and selectable item pairings, and/or the like. Recursive feature elimination is a greedy optimization algorithm that aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

According to some aspects, one or more candidate intents, information formats, demographic and selectable item pairings, and/or the like may be determined according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to an absolute value of the magnitude of coefficients and ridge regression performs L2 regularization which adds a penalty equivalent to the square of the magnitude of coefficients.

After item analysis module 114 generates a feature set(s), the item analysis module 114 may generate a machine learning-based classification model 340 based on the feature set(s). A machine learning-based predictive model may refer to a complex mathematical model for data classification that is generated using machine-learning techniques. For example, this machine learning-based classifier may include a map of support vectors that represent boundary features. By way of example, boundary features may be selected from, and/or represent the highest-ranked features in, a feature set.

According to some aspects, the item analysis module 114 may use the feature sets extracted from the training datasets 310A-310N and/or the labeled baseline data to build a machine learning-based classification model 340A-340N to determine and/or predict intents, information formats, demographic and selectable item pairings, and/or the like. According to some aspects, the machine learning-based classification models 340A-340N may be combined into a single machine learning-based classification model 340 (340A-340N). Similarly, the machine learning-based classifier 330 may represent a single classifier containing a single or a plurality of machine learning-based classification models 340 and/or multiple classifiers containing a single or a plurality of machine learning-based classification models 340. According to some aspects, the machine learning-based classifier 330 may also include each of the training datasets 310A-310N and/or each feature set extracted from the training datasets 310A-310N and/or extracted from the labeled baseline data. Although shown separately, item analysis module 114 may include the machine learning-based classifier 330.

The extracted features from the imaging data may be combined in a classification model trained using a machine learning approach such as discriminant analysis; a decision tree; a nearest neighbor (NN) algorithm (e.g., k-NN models, replicator NN models, etc.); a statistical algorithm (e.g., Bayesian networks, etc.); a clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; a principal component analysis (PCA) (e.g., for linear models); a multi-layer perceptron (MLP) ANNs (e.g., for non-linear models); replicating reservoir networks (e.g., for non-linear models, typically for time series); random forest classification; a combination thereof and/or the like. The resulting machine learning-based classifier 330 may comprise a decision rule or a mapping that uses imaging data to determine and/or predict intents, information formats, demographic and selectable item pairings, and/or the like.

The imaging data and/or data from various sources (e.g., the third-party device 116 of FIG. 1, online and cloud-based resources, social media, item review sites, etc.) describing selectable items at various locations (e.g., restaurants, merchant locations, etc.), and the machine learning-based classifier 330 may be used to determine and/or predict intents, information formats, demographic and selectable item pairings, and/or the like for the test samples in the test dataset. For example, the result for each test sample may include a confidence level that corresponds to a likelihood or a probability that the corresponding test sample accurately determines and/or predicts intents, information formats, demographic and selectable item pairings, and/or the like. The confidence level may be a value between zero and one that represents a likelihood that the determined/predicted intents, information formats, demographic and selectable item pairings, and/or the like are consistent with computed values. Multiple confidence levels may be provided for each test sample and each candidate (approximated) intent, information format, demographic and selectable item pairing, and/or the like. A top-performing candidate intent, information format, demographic and selectable item pairing, and/or the like may be determined by comparing the results obtained for each test sample with a computed intent, information format, demographic and selectable item pairing, and/or the like for each test sample. In general, the top-performing candidate intent, information format, demographic and selectable item pairing, and/or the like will have results that closely match the computed intent, information format, demographic and selectable item pairing, and/or the like. The top-performing candidate intents, information formats, demographic and selectable item pairings, and/or the like may be used by a user interface to depict informational elements for selectable items and/or related operations.

Figure 4:
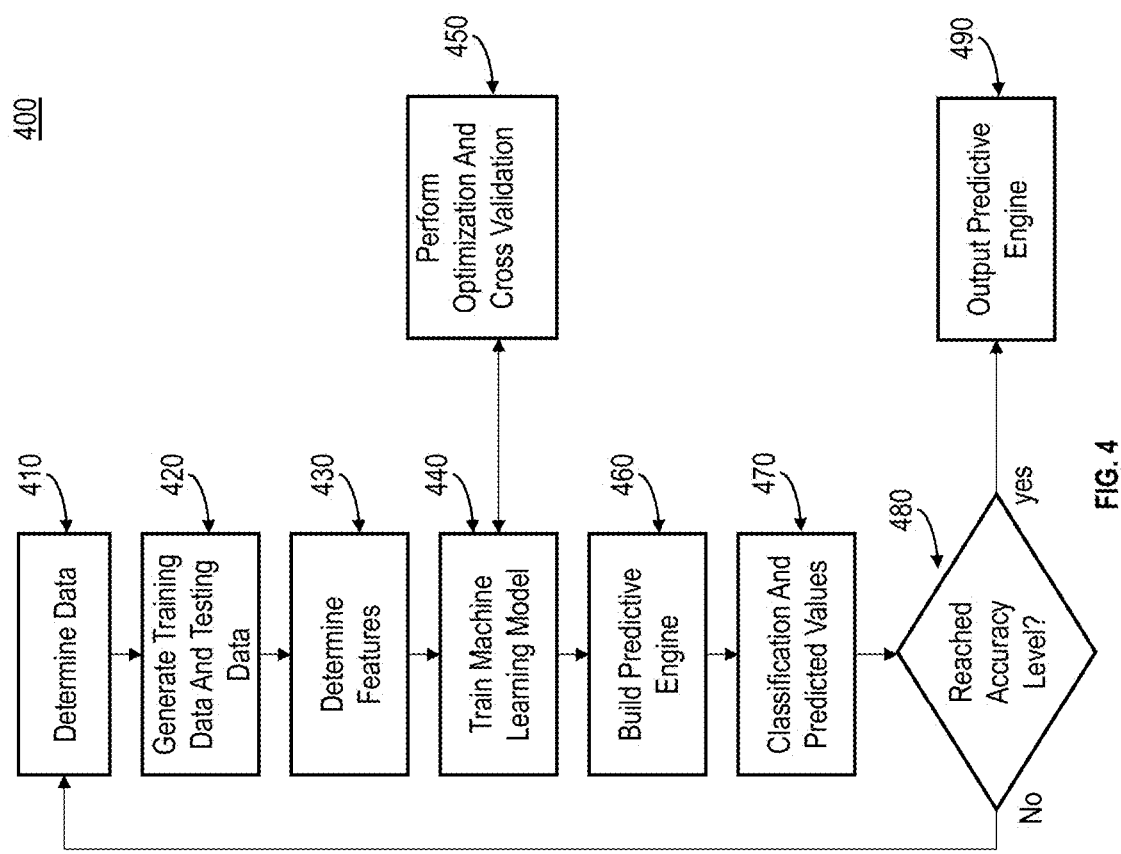
FIG. 4 shows a flowchart of an example training method for generating a machine learning classifier to classify intents used for a user interface to depict informational elements for selectable items, according to some aspects.

FIG. 4 is a flowchart illustrating an example training method 400. According to some aspects of this disclosure, method 400 configures machine learning classifier 330 for classification through a training process using the item analysis module 114. The item analysis module 114 can implement supervised, unsupervised, and/or semi-supervised (e.g., reinforcement-based) machine learning-based classification models 340. The method 400 shown in FIG. 4 is an example of a supervised learning method; variations of this example of training method are discussed below, however, other training methods can be analogously implemented to train unsupervised and/or semi-supervised machine learning (predictive) models. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-2E. However, method 400 is not limited to the aspects of those figures.

In 410, the item analysis module 114 determines, receives, and/or the like, image data depicting selectable items from multiple user devices (e.g., the user device(s) 104, etc.) and various sources (e.g., the third-party device 116 of FIG. 1, online and cloud-based resources, social media, item review sites, etc.) describing selectable items at various locations (e.g., restaurants, merchant locations, etc.). Image data and/or data from various sources may be used to generate one or more datasets, each dataset associated with an intent, information format, demographic and selectable item pairing, and/or the like.

In 420, item analysis module 114 generates a training dataset and a testing dataset. According to some aspects, the training dataset and the testing dataset may be generated by indicating an intent, information format, demographic and selectable item pairing, and/or the like. According to some aspects, the training dataset and the testing dataset may be generated by randomly assigning an intent, information format, demographic and selectable item pairing, and/or the like to either the training dataset or the testing dataset. According to some aspects, the assignment of image data and/or data from various sources as training or test samples may not be completely random. According to some aspects, only the labeled baseline data for a specific feature extracted from specific image data and/or specific data from various sources (e.g., data indicating positive intents for selectable items, etc.) may be used to generate the training dataset and the testing dataset. According to some aspects, a majority of the labeled baseline data extracted from image data and/or data from various sources may be used to generate the training dataset. For example, 75% of the labeled baseline data for determining an intent, information format, demographic and selectable item pairing, and/or the like extracted from the content and/or content item data may be used to generate the training dataset and 25% may be used to generate the testing dataset. Any method or technique may be used to create the training and testing datasets.

In 430, item analysis module 114 determines (e.g., extract, select, etc.) one or more features that can be used by, for example, a classifier (e.g., a software model, a classification layer of a neural network, etc.) to label features extracted from a variety of image data and/or data from various sources. One or more features may comprise indications of an intent, information format, demographic and selectable item pairing, and/or the like. According to some aspects, the item analysis module 114 may determine a set of training baseline features from the training dataset. Features of content and/or content item data may be determined by any method.

In 440, item analysis module 114 trains one or more machine learning models, for example, using the one or more features. According to some aspects, the machine learning models may be trained using supervised learning. According to some aspects, other machine learning techniques may be employed, including unsupervised and semi-supervised learning. The machine learning models trained in 340 may be selected based on different criteria (e.g., how close a predicted intent, information format, demographic and selectable item pairing, and/or the like is to an actual intent, information format, demographic and selectable item pairing, and/or the like, etc.) and/or data available in the training dataset. For example, machine learning classifiers can suffer from different degrees of bias. According to some aspects, more than one machine learning model can be trained.

In 450, item analysis module 114 optimizes, improves, and/or cross-validates trained machine learning models. For example, data for training datasets and/or testing datasets may be updated and/or revised to include more labeled data indicating different intents, information formats, demographic and selectable item pairings, and/or the like.

In 460, item analysis module 114 selects one or more machine learning models to build a predictive model (e.g., a machine learning classifier, a predictive engine, etc.). The predictive model may be evaluated using the testing dataset.

In 470, item analysis module 114 executes the predictive model to analyze the testing dataset and generate classification values and/or predicted values.

In 480, item analysis module 114 evaluates classification values and/or predicted values output by the predictive model to determine whether such values have achieved the desired accuracy level. Performance of the predictive model may be evaluated in a number of ways based on a number of true positive, false positive, true negative, and/or false negative classifications of the plurality of data points indicated by the predictive model. For example, the false positives of the predictive model may refer to the number of times the predictive model incorrectly predicted and/or determined an intent, information format, demographic and selectable item pairing, and/or the like. Conversely, the false negatives of the predictive model may refer to the number of times the machine learning model predicted and/or determined an intent, information format, demographic and selectable item pairing, and/or the like incorrectly, when in fact, the predicted and/or determined intent, information format, demographic and selectable item pairing, and/or the like matches an actual intent, information format, demographic and selectable item pairing, and/or the like. True negatives and true positives may refer to the number of times the predictive model correctly predicted and/or determined an intent, information format, demographic and selectable item pairing, and/or the like. Related to these measurements are the concepts of recall and precision. Generally, recall refers to a ratio of true positives to a sum of true positives and false negatives, which quantifies the sensitivity of the predictive model. Similarly, precision refers to a ratio of true positives as a sum of true and false positives.

In 490, item analysis module 114 outputs the predictive model (and/or an output of the predictive model). For example, item analysis module 114 may output the predictive model when a desired accuracy level is reached. An output of the predictive model may end the training phase.

According to some aspects, when the desired accuracy level is not reached, in 490, item analysis module 114 may perform a subsequent iteration of the training method 400 starting at 410 with variations such as, for example, considering a larger collection of image data and/or data from various sources (e.g., the third-party device 116 of FIG. 1, online and cloud-based resources, social media, item review sites, etc.) describing selectable items at various locations (e.g., restaurants, merchant locations, etc.).

Figure 5:
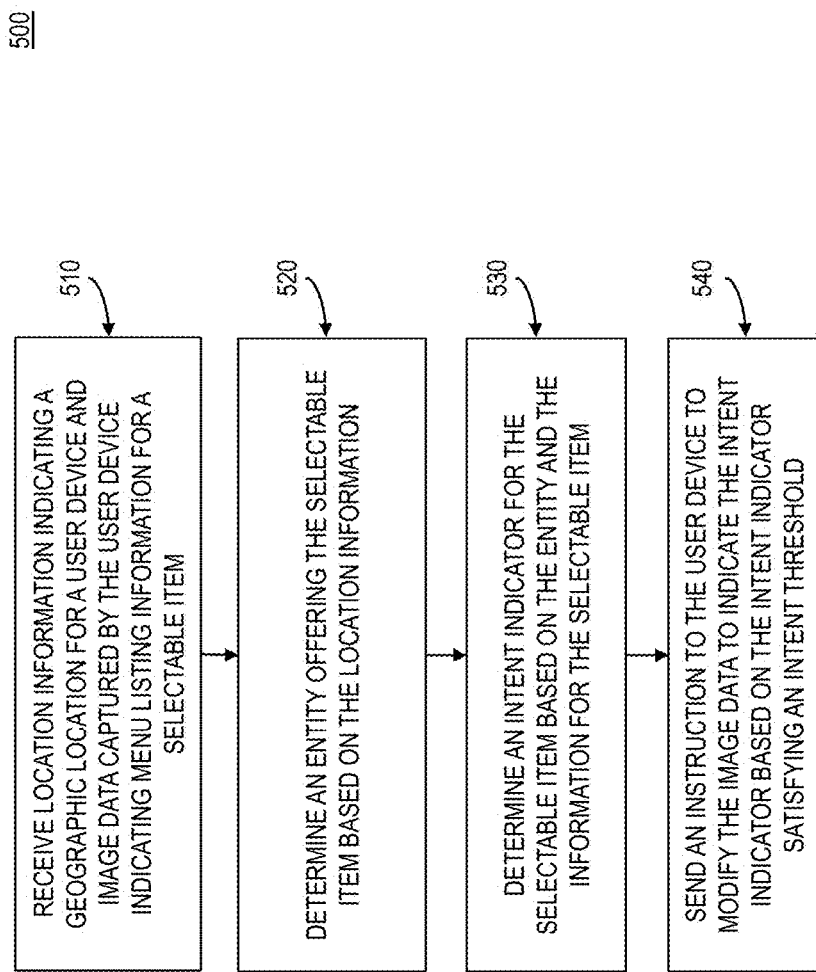
FIG. 5 shows a flowchart of an example method for a user interface to depict informational elements for selectable items, according to some aspects.

FIG. 5 shows a flowchart of an example method 500 for a user interface to depict informational elements for selectable items, according to some aspects. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 400 shall be described with reference to FIGS. 1-4. However, method 500 is not limited to the aspects of those figures.

In 510, computing device 110 receives location information indicating a geographic location of a user device and image data captured by the user device (e.g., the user device 104 of FIG. 1, a mobile device, a smart device, a computing device, a wearable device, etc.) of a listing (e.g., a menu, an event ticket, a content source, etc.) for a selectable item. For example, a selectable item may include a food menu item, a product, a device, and/or any other type of item that may be selected from a plurality of items. According to some aspects, the location information may be determined by a location sensor (e.g., a Global Positioning System (GPS) sensor, etc.) of the user device. The computing device 110 may receive the location information from the user device. According to some aspects, the location information may be determined from data/information indicative of the location, for example, such as an IP address and/or the like, received from a user device (e.g., the user device 104 of FIG. 1, a mobile device, a smart device, a computing device, a wearable device, etc.) with the image data.

In 520, computing device 110 determines an entity offering the selectable item. For example, the computing device 110 may determine the entity offering the selectable item based on the location information. According to some aspects, the computing device 110 may assign a location indicated by the location information as a location associated with the entity offering the selectable item.

In 530, computing device 110 determines an intent indicator for the selectable item. For example, the computing device 110 may determine the intent indicator for the selectable item based on the entity (and/or location of the entity) and the information for the selectable item. According to some aspects, the computing device 110 may determine the intent indicator for the selectable item by inputting the location information and the information for the selectable item into a predictive model trained to identify intents from information describing selectable items at various locations (and/or for various entities at various locations). According to some aspects, the predictive model may be trained to access, query, and/or receive data/information from multiple sources (e.g., the third-party device 116 of FIG. 1, online and cloud-based resources, social media, item review sites, etc.), and identify information (e.g., comments, text, symbols, emojis, etc.) indicative of intent (e.g., opinion, sentiment, view, reputation, etc.) for the selectable item. The intent indicator may be indicative of portions and/or all of the data/information from the multiple sources indicative of intent. The computing device 110 may receive the intent indicator for the selectable item from the predictive model.

In 530, computing device 110 sends an instruction to the user device that causes modification of the image data to indicate the intent indicator. For example, the computing device 110 may send an instruction (and/or signal, command, (and/or signal, command, a REST API Command, etc.) to the user device that causes modification of the image data to indicate the intent indicator based on the intent indicator satisfying an intent threshold that defines a level at which an intent is classified (e.g., by a predictive model, etc.) as a positive intent.

According to some aspects, method 500 may further include causing display of the modified image data. For example, computing device 110 may send an instruction to the user device that causes the user device to display the modified image data. According to some aspects, the intent indicator may be displayed as an overlay of at least a portion of the information for the selectable item.

According to some aspects, method 500 may further include receiving an identifier of the user device with the image data and/or the location information. The computing device 110 may identify a user profile for a user of the user device based on the identifier of the user device. The computing device 110 may determine a notification for the selectable item based on the user profile. For example, according to some aspects, the notification may include one or more dietary restrictions for the user indicated by the user profile. According to some aspects, the notification may include account information (e.g., available funds, recent transactions, restricted purchase items, etc.) for the user indicated by the user profile. The notification may include any information within a user profile. According to some aspects, the computing device 110 may send an instruction to the user device that causes the user device to display the notification as an overlay of the information for the selectable item.

According to some aspects, the information for the selectable item may be in a first format (e.g., language, font, script, symbolized form, etc.). According to some aspects, method 500 may further include determining rules defining the first format based on the information for the selectable item in the first format. For example, the computing device 110 may access a data source, data repository, third-party application, and/or the like to receive/retrieve the rules defining information in various formats (e.g., the first format, a second format, n-th format, etc.). The computing device 110 may transform the information for the selectable item in the first format to a second format, for example, based on at least one rule of the rules defining the first format being mapped to at least one rule of rules defining the second format (e.g., language, font, script, symbolized form, etc.). According to some aspects, the computing device 110 may send an instruction to the user device that causes the user device to display the information for the selectable item in the second format as an overlay of the information for the selectable item in the first format.

According to some aspects, the information for the selectable item may indicate an amount of a type of currency associated with the selectable item. According to some aspects, method 500 may further include determining an amount of a different type of currency associated with the selectable item. For example, according to some aspects, the computing device 110 may determine an amount of a different type of currency associated with the selectable item based on currency exchange information and the amount of the type of currency associated with the selectable item. According to some aspects, the computing device 110 may send an instruction to the user device that causes the user device to display the amount of the different type of currency as an overlay of the amount of the type of currency associated with the selectable item.

Figure 6:
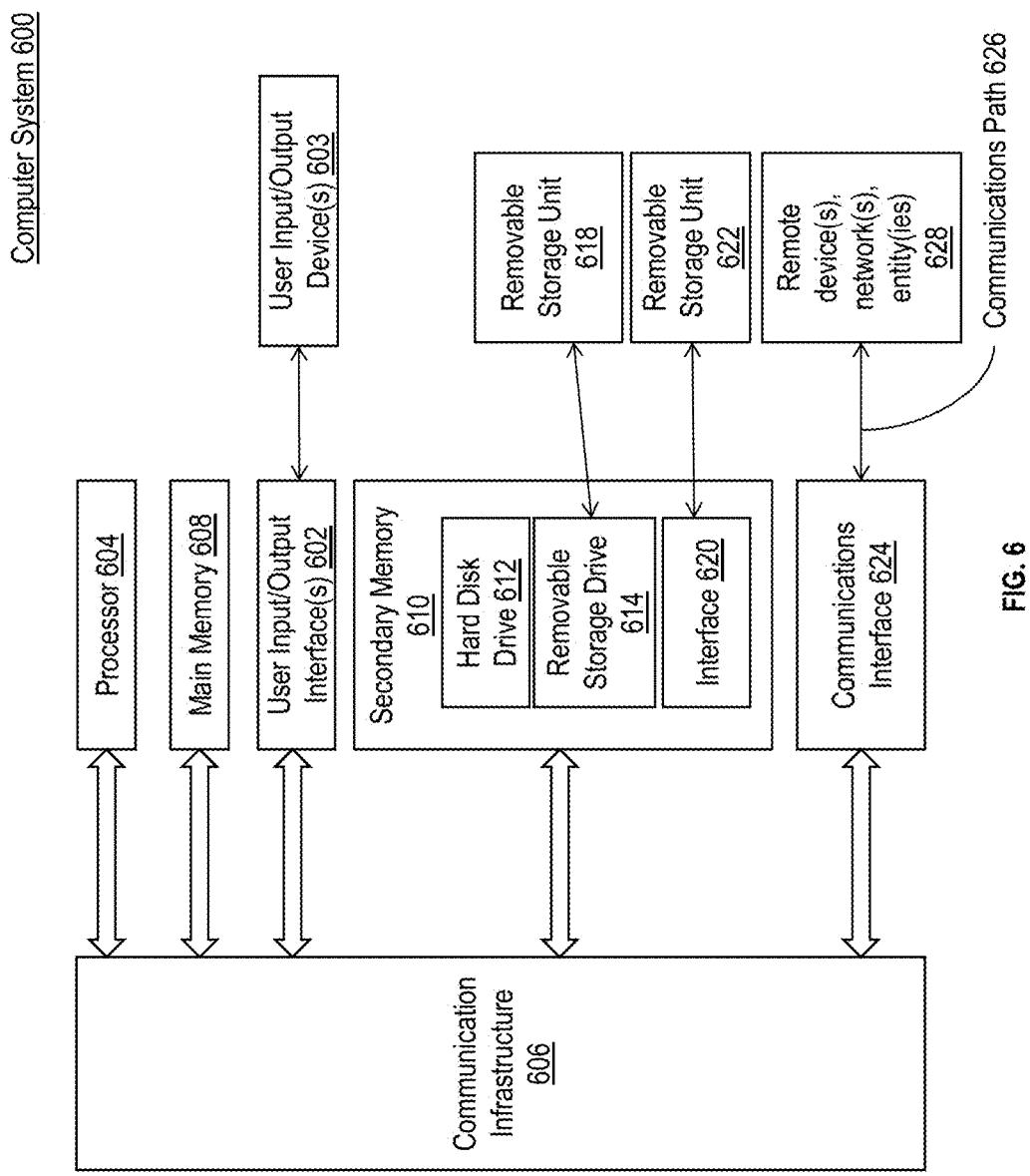
FIG. 6 shows an example computer system, according to embodiments of the present disclosure.

FIG. 6 is an example computer system useful for implementing various embodiments. Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as processor 604. Processor 604 may be connected to a bus or a communication infrastructure 606.

Computer system 600 may also include user input/output device(s) 603, such as monitors, keyboards, pointing devices, etc., which may communicate with a bus or communication infrastructure 606 through user input/output device(s) 603.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or secondary memory 610. Secondary memory 610 may include, for example, a hard disk drive 612 and/or a drive or a removable storage device 614. Removable storage drive 614 may be a floppy disk drive, a magnetic tape drive, a compact disk drive, an optical storage device, a tape backup device, and/or any other storage device/drive.

Removable storage drive 614 may interact with a removable storage unit 618. The removable storage unit 618 may include a computer-usable or readable storage device having stored thereon computer software (control logic) and/or data. Removable storage unit 618 may be a floppy disk, magnetic tape, compact disk, DVD, optical storage disk, and/ any other computer data storage device. Removable storage drive 614 may read from and/or write to the removable storage unit 618.

Secondary memory 610 may include other means, devices, components, instrumentalities, and/or other approaches for allowing computer programs and/or other instructions and/or data to be accessed by computer system 600. Such means, devices, components, instrumentalities, and/or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communications interface 624 may enable computer system 600 to communicate and interact with any combination of external devices, external networks, external entities, etc. (individually and collectively referenced by reference number 628). For example, communications interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communications path 626.

Computer system 600 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning includes specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for a user interface for depicting informational elements for selectable items comprising:
    receiving location information indicating a geographic location of a user device and image data captured by the user device of information for a selectable item in a first format;
    determining, based on an entity identified from the location information that offers the selectable item and the information for the selectable item, an intent indicator for the selectable item;
    transforming, based on a rule defining the first format mapped to a rule defining a second format, the information for the selectable item in the first format to the second format; and
    sending, based on the intent indicator satisfying an intent threshold that defines a level at which an intent is classified as a positive intent and the transforming the information for the selectable item to the second format, instructions to the user device that cause modification of the image data to indicate the intent indicator and display of the information for the selectable item in the second format as an overlay of the information for the selectable item in the first format.

2. The computer-implemented method of claim 1, wherein the location information is determined by a location sensor of a user device, and wherein the receiving the location information comprises receiving the location information from the user device.

3. The computer-implemented method of claim 1, further comprising sending an instruction to the user device that causes display of the modified image data, wherein the intent indicator is displayed as an overlay of at least a portion of the information for the selectable item.

4. The computer-implemented method of claim 1, wherein the determining the intent indicator for the selectable item comprises:
    inputting, to a predictive model trained to identify intents from information describing selectable items at various locations, the location information and the information for the selectable item; and
    receiving, from the predictive model, the intent indicator for the selectable item.

5. The computer-implemented method of claim 1, wherein the receiving the location information and the image data further comprises receiving an identifier of the user device, the computer-implemented method further comprising:
    identifying, based on the identifier of the user device, a user profile for a user of the user device;
    determining, based on the user profile, a notification for the selectable item; and
    sending an instruction to the user device that causes display of the notification as an overlay of the information for the selectable item.

6. The computer-implemented method of claim 1, wherein the first format is based on a first language and the second format is based on a second language, or wherein the first format is a textual format and the second format is a visual representation of the selectable item.

7. The computer-implemented method of claim 1, wherein the information for the selectable item indicates an amount of a type of currency associated with the selectable item, the computer-implemented method further comprising:
    determining, based on currency exchange information and the amount of the type of currency associated with the selectable item, an amount of a different type of currency associated with the selectable item; and
    sending an instruction to the user device that causes display of the amount of the different type of currency as an overlay of the amount of the type of currency associated with the selectable item.

8. A non-transitory computer-readable medium having instructions stored thereon that, when executed by at least one computing device, cause the at least one computing device to perform operations for a user interface to depict informational elements for selectable items, the operations comprising:
    receiving location information indicating a geographic location of a user device and image data captured by the user device of information for a selectable item in a first format;

determining, based on an entity identified from the location information that offers the selectable item and the information for the selectable item, an intent indicator for the selectable item;

transforming, based on a rule defining the first format mapped to a rule defining a second format, the information for the selectable item in the first format to the second format; and sending, based on the intent indicator satisfying an intent threshold that defines a level at which an intent is classified as a positive intent and the transforming the information for the selectable item to the second format, instructions to the user device that cause modification of the image data to indicate the intent indicator and display of the information for the selectable item in the second format as an overlay of the information for the selectable item in the first format.

9. The non-transitory computer-readable medium of claim 8, wherein the location information is determined by a location sensor of a user device, wherein the receiving the location information comprises receiving the location information from the user device.

10. The non-transitory computer-readable medium of claim 8, the operations further comprising causing display of the modified image data, wherein the intent indicator is displayed as an overlay of at least a portion of the information for the selectable item.

11. The non-transitory computer-readable medium of claim 8, wherein the determining the intent indicator for the selectable item comprises:

inputting, to a predictive model trained to identify intents from information describing selectable items at various locations, the location information and the information for the selectable item; and receiving, from the predictive model, the intent indicator for the selectable item.

12. The non-transitory computer-readable medium of claim 8, wherein the receiving the location information and the image data further comprises receiving an identifier of the user device, the operations further comprising:

identifying, based on the identifier of a user device, a user profile for a user of the user device;

determining, based on the user profile, a notification for the selectable item; and sending an instruction to the user device that causes display of the notification as an overlay of the information for the selectable item.

13. The non-transitory computer-readable medium of claim 8, wherein the first format is based on a first language and the second format is based on a second language, or wherein the first format is a textual format and the second format is a visual representation of the selectable item.

14. The non-transitory computer-readable medium of claim 8, wherein the information for the selectable item indicates an amount of a type of currency associated with the selectable item, the operations further comprising:

determining, based on currency exchange information and the amount of the type of currency associated with the selectable item, an amount of a different type of currency associated with the selectable item; and sending an instruction to the user device that causes display of the amount of the different type of currency as an overlay of the amount of the type of currency associated with the selectable item.

15. A system comprising:
a memory; and at least one processor coupled to the memory and configured to perform operations for a user interface to depict informational elements for selectable items, the operations comprising:

receiving location information indicating a geographic location of a user device and image data captured by the user device of information for a selectable item in a first format;

determining, based on an entity identified from the location information that offers the selectable item and the information for the selectable item, an intent indicator for the selectable item;

transforming, based on a rule defining the first format mapped to a rule defining a second format, the information for the selectable item in the first format to the second format; and sending, based on the intent indicator satisfying an intent threshold that defines a level at which an intent is classified as a positive intent and the transforming the information for the selectable item to the second format, instructions to the user device that cause modification of the image data to indicate the intent indicator and display of the information for the selectable item in the second format as an overlay of the information for the selectable item in the first format.

16. The system of claim 15, the operations further comprising sending an instruction to the user device that causes display of the modified image data, wherein the intent indicator is displayed as an overlay of at least a portion of the information for the selectable item.

17. The system of claim 15, wherein the determining the intent indicator for the selectable item comprises:

inputting, to a predictive model trained to identify intents from information describing selectable items at various locations, the location information and the information for the selectable item; and receiving, from the predictive model, the intent indicator for the selectable item.

18. The system of claim 15, wherein the receiving the location information and the image data further comprises receiving an identifier of the user device, the operations further comprising:

identifying, based on the identifier of the user device, a user profile for a user of the user device;

determining, based on the user profile, a notification for the selectable item; and sending an instruction to the user device that causes display of the notification as an overlay of the information for the selectable item.

19. The system of claim 15, wherein the first format is based on a first language and the second format is based on a second language, or wherein the first format is a textual format and the second format is a visual representation of the selectable item.

20. The system of claim 15, wherein the information for the selectable item indicates an amount of a type of currency associated with the selectable item, the operations further comprising:

determining, based on currency exchange information and the amount of the type of currency associated with the selectable item, an amount of a different type of currency associated with the selectable item; and sending an instruction to the user device that causes display of the amount of the different type of currency as an overlay of the amount of the type of currency associated with the selectable item.

\* \* \* \* \*